US011911922B2

(12) United States Patent
Rahbek

(10) Patent No.: US 11,911,922 B2
(45) Date of Patent: Feb. 27, 2024

(54) MULTI TOOL WITH A WRITING UTENSIL AND A KNIFE

(71) Applicant: Kirbek Holding APS, Klouborg (DK)

(72) Inventor: Martin Rahbek, Klouborg (DK)

(73) Assignee: Kirbek Holding APS, Klouborg (DK)

( * ) Notice: Subject to any disclaimer, the term of this patent is extended or adjusted under 35 U.S.C. 154(b) by 0 days.

(21) Appl. No.: 17/763,204

(22) PCT Filed: Sep. 25, 2020

(86) PCT No.: PCT/EP2020/076951
§ 371 (c)(1),
(2) Date: Mar. 24, 2022

(87) PCT Pub. No.: WO2021/058766
PCT Pub. Date: Apr. 1, 2021

(65) Prior Publication Data

US 2022/0331997 A1 Oct. 20, 2022

(30) Foreign Application Priority Data

Sep. 25, 2019 (DK) ............................ PA201970591

(51) Int. Cl.
*B26B 1/08* (2006.01)
*B26B 11/00* (2006.01)

(52) U.S. Cl.
CPC ................ *B26B 1/08* (2013.01); *B26B 11/00* (2013.01)

(58) Field of Classification Search
CPC .................................. B26B 1/08; B26B 11/00
(Continued)

(56) References Cited

U.S. PATENT DOCUMENTS 695,009 A 3/1902 Swan
1,953,690 A * 4/1934 Samways ................. B25F 1/00 30/162

(Continued)

FOREIGN PATENT DOCUMENTS

DE 202010004932 U1 7/2010
EP 1362711 11/2003

(Continued)

*Primary Examiner* — Hadi Shakeri

(57) ABSTRACT

A multi tool comprising a housing, a first writing utensil, a knife and an activation mechanism, where the first writing utensil and the knife are slideably arranged in a forward portion of the housing, said activation mechanism being arranged to independently move the first writing utensil or the knife along the longitudinal extension of the front portion of the housing such that multi tool can assume one of three positions, a first position where the knife extends out of the forward portion of the housing, a second position where the writing utensil extends out of the forward portion of the housing and a third position where both the knife and the writing utensil are retracted into the housing. The housing comprises a first opening in the forward portion of the housing having a circular cross section for fitting the writing utensil and a second opening in the forward portion of the housing having a rectangular cross section for fitting the knife, said rectangular cross section having a height which is at least twice its width. In this way a multi tool is provided which has a very stable operating position in both the knife mode and the writing mode.

3 Claims, 2 Drawing Sheets

(58) Field of Classification Search
USPC .............................................. 7/118, 158, 160
See application file for complete search history.

(56) References Cited

U.S. PATENT DOCUMENTS

| | | | | | |
|---|---|---|---|---|---|
| 3,750,729 | A * | 8/1973 | Lemieux | B25G 1/085 | 81/439 |
| 6,554,163 | B1 * | 4/2003 | Kaye | B26B 25/005 | 30/162 |
| 6,954,958 | B2 * | 10/2005 | Stubbs | B25F 1/04 | 30/169 |
| 10,150,222 | B2 * | 12/2018 | Raymond | B43L 9/04 | |
| 2002/0007705 | A1 | 1/2002 | Beauchamp | | |
| 2012/0031507 | A1 | 12/2012 | Roberts et al. | | |
| 2012/0315074 | A1 | 12/2012 | Roberts et al. | | |
| 2022/0000770 | A1 | 1/2022 | Beauchamp | | |

FOREIGN PATENT DOCUMENTS

| | | |
|---|---|---|
| FR | 2207034 | 6/1967 |
| GB | 2415160 | 12/2005 |
| KR | 102091564 | 5/2020 |
| WO | 2010/024346 | 3/2010 |
| WO | 2018/162015 | 9/2018 |

* cited by examiner

MULTI TOOL WITH A WRITING UTENSIL AND A KNIFE

The current invention relates to a multi tool as described in the introductory portion of claim 1.

DESCRIPTION OF RELATED ART

It is well known in the art to have writing devices housing multiple writing utensils inside a single housing. For example, multi ink pens are known having a single housing with multiple different coloured pens arranged in the housing. The user can then choose between different pens by sliding buttons on the housing. An example of such a device is provided in EP1362711.

It is also known to have different types of writing utensils, for example a pencil and a ball point pen arranged in a single housing. One such device is disclosed in WO 2010/024346.

Lately other types of devices have also been introduced where non-writing utensils are combined with writing utensils. For example, one multi tool disclosed in the prior art is WO 2018/162015 which discloses a multi tool comprising both a pen and a knife. Another multi tool disclosed in the prior art is shown in FR2207034. In these tools, a very small knife is added to the tip of a shaft, said shaft having similar dimensions to a normal ball point pen.

While the combination of a writing utensil and a knife seem to show a number of benefits for many different people, the prior art devices have not been successful and have not made it to market as disclosed.

SUMMARY OF THE INVENTION

It is a first aspect of the current invention to provide a multi tool as mentioned in the introductory paragraph which has a more effective knife that the prior art.

It is a second aspect of the current invention to provide a multi tool as mentioned in the introductory paragraph which provides a stable knife position and a stable writing utensil position.

These aspects are provided at least in part by a multi tool as mentioned in the introductory paragraph which further comprises the characterizing features of claim 1.

Additional beneficial features are disclosed in the dependent claims.

It should be emphasized that the term "comprises/comprising/comprised of" when used in this specification is taken to specify the presence of stated features, integers, steps or components but does not preclude the presence or addition of one or more other features, integers, steps, components or groups thereof.

Figures 1, 2, 3, 4, 5:
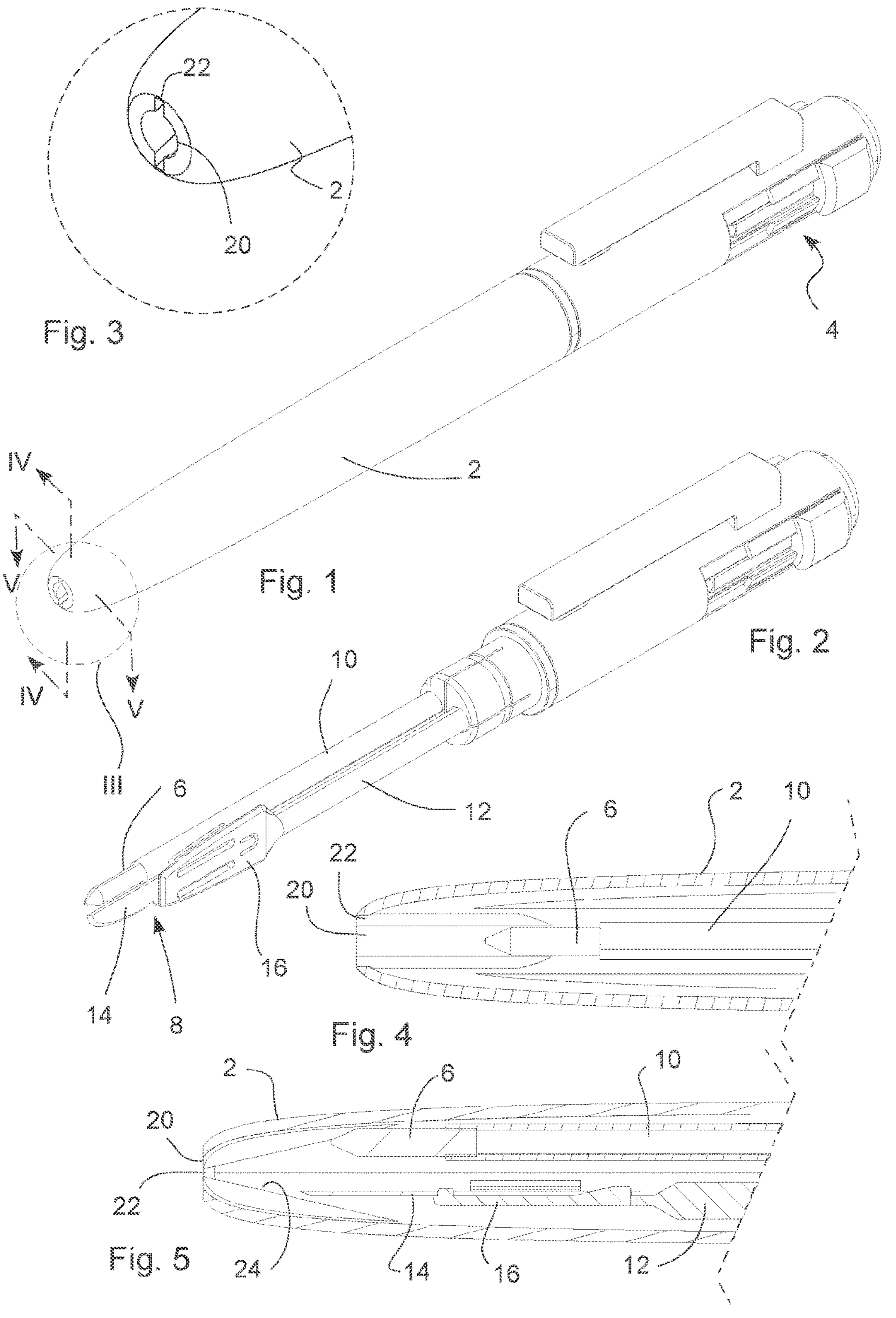
FIG. 1 shows a perspective view of a first embodiment of a multi tool according to the invention.
FIG. 2 shows a perspective view of the multi tool of FIG. 1 with the forward part of the housing removed.
FIG. 3 shows a detailed perspective view of the front portion of the multi tool of FIG. 1 as defined by the circle III in FIG. 1.
FIG. 4 shows a cross sectional view through the forward portion of the multi tool of FIG. 1 as defined by the line IV-IV in FIG. 1.
FIG. 5 shows a cross sectional view through the forward portion of the multi tool of FIG. 1 as defined by the line V-V in FIG. 1.

In the following, the invention will be described in greater detail with reference to embodiments shown by the enclosed figures. It should be emphasized that the embodiments shown are used for example purposes only and should not be used to limit the scope of the invention.

DETAILED DESCRIPTION OF THE EMBODIMENTS

FIGS. 1 to 5 shows different views of a first embodiment 1 of a multi tool according to the invention. The multi tool comprises a housing 2, a displacement mechanism 4, a writing utensil 6 which in this embodiment is a ball point pen and a knife 8. The writing utensil 6 and the knife 8 in this embodiment are arranged on shafts 10, 12 connected to the displacement mechanism 4. The displacement mechanism can be similar to the one which is found on many multi utensil pens and as such will not be described in detail here as the person skilled in the art of pens will know multiple different types of displacement mechanisms to choose from.

Of interest in this embodiment, is the fact that one of the tools is a knife 8. The knife in this embodiment, comprises a replaceable scalpel blade 14 and a holder 16 mounted to the end of the shaft 12. The blade is a scalpel of the kind known in the art and can be purchased from many different office supply stores and or medical stores. The blade can be exchanged by removing the housing 2 of the multi tool and removing the blade from the holder 16 and then inserting a new blade. However, within the scope of the invention, a multi tool with a non replaceable blade, for example a blade which is glued to the shaft 12, could also be imagined.

Of special interest in this embodiment, is that the blade is quite large and has a significant surface area. This makes the blade much more effective than prior art type blades. However previously this type of large blade was not possible to use. In this current embodiment, the frontal portion of the housing is provided with two separate openings placed on top of each other. A first opening 20 is an opening with a circular cross section and is roughly the same size as the outer diameter of the writing utensil 6. In this way, when the writing utensil is activated by pushing the writing utensil shaft 10 out through the housing via the displacement mechanism, then the writing utensil is held firmly in place during writing by the circular opening. However, on top of (or concentrically with) the circular opening is also a rectangular opening 22. The rectangular opening has a height (in the orientation of the figures) which is greater than the diameter of the circular opening and a width which is smaller than the diameter of the circular opening. In this way, the rectangular opening just fits the blade of the knife 14. In this way, when the knife is pushed out of the housing via the displacement mechanism, the knife is held firmly in place by the rectangular opening.

As can be seen from FIG. 5, the tip portion of the housing on the inside is provided with a tapered portion 24 which tapers towards the first and second openings. In this way, then the writing utensil or the knife are pushed forward, they will be guided into the correct opening by the tapered portion.

Hence, in this embodiment, by providing two separate openings, one which is shaped to correspond to the outer shape of the writing implement and one which is shaped to correspond to the outer shape of the knife, a multi tool is provided where both the writing implement and the knife are held firmly in place during use. This makes the tool easier and safer to use and more effective.

Figure 6:
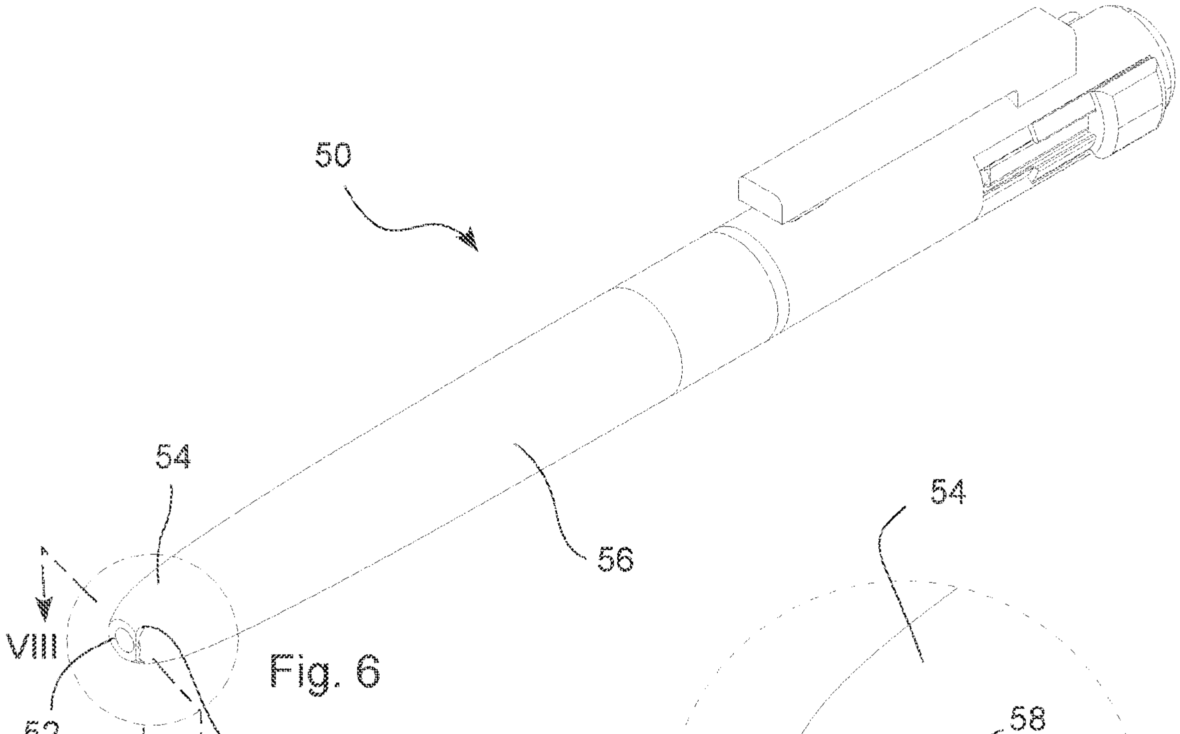
FIG. 6 shows a perspective view of a second embodiment of a multi tool according to the invention.
Figure 7:
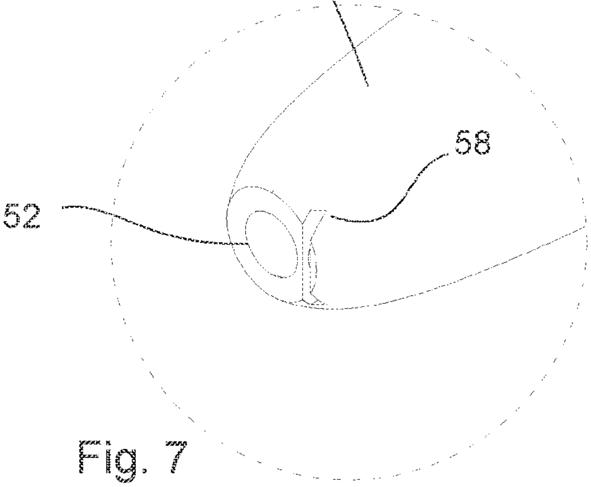
FIG. 7 shows a detailed perspective view of a forward portion of the multi tool of FIG. 6 as defined by the circle VII in FIG. 6.
Figure 8:
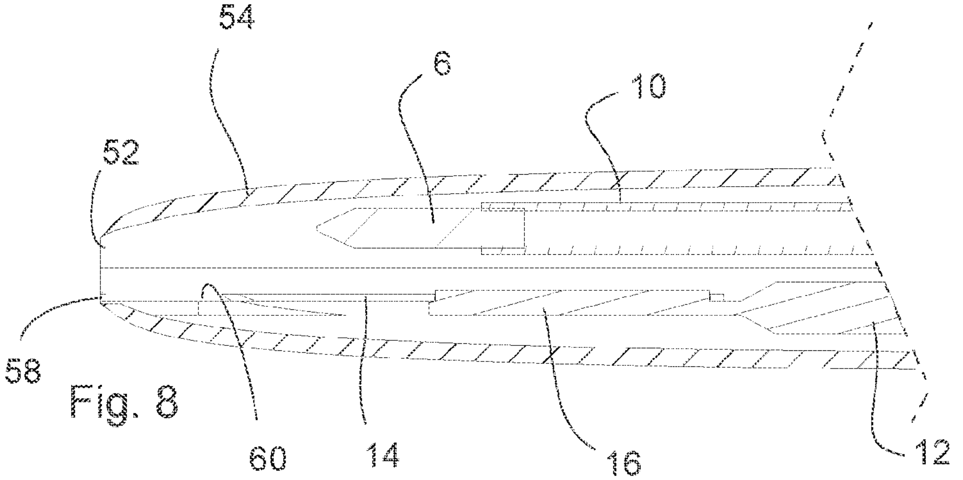
FIG. 8 shows a cross sectional view through the forward portion of the multi tool of FIG. 6 as defined by the line VIII-VIII in FIG. 6.

FIGS. 6 to 8 show some different views of a second embodiment 50 of a multi tool according to the current invention. For the most part this embodiment, is very similar to the previous embodiment 1, so it will not be described in detail. However of interest is that instead of placing the two openings on top of each other as in the previous embodiment, in this embodiment, the two openings are placed beside each other. Just as in the previous embodiment, a first opening 52 with a circular cross section is provided in the tip portion 54 of the housing 56. A second opening 58 with a rectangular cross section is provided beside the first opening. As such, the two openings are provided as completely separate openings. As in the first embodiment, the first opening 52 is a circular opening which corresponds to the outer diameter of the writing utensil. Likewise, the second opening is a rectangular opening which has an outer shape which corresponds to the outer shape of the knife. As before, the first opening is wider than the second opening, but the second opening is higher than the first opening.

In this embodiment, a flat support surface 60 is provided inside the frontal portion of the housing to support the motion of the knife inside the housing.

It is to be noted that the figures and the above description have shown the example embodiments in a simple and schematic manner. Many of the specific mechanical details have not been shown since the person skilled in the art should be familiar with these details and they would just unnecessarily complicate this description. For example, the specific materials used and the specific manufacturing procedures have not been described in detail since it is maintained that the person skilled in the art would be able to find suitable materials and suitable processes to manufacture the multi tool according to the current invention.

The invention claimed is:

1. A multi tool comprising a housing, a first writing utensil, a knife and an activation mechanism, where the first writing utensil and the knife are slideably arranged in a forward portion of the housing, said activation mechanism being arranged to independently move the first writing utensil or the knife along the longitudinal extension of the front portion of the housing such that multi tool can assume one of three positions, a first position where the knife extends out of the forward portion of the housing, a second position where the writing utensil extends out of the forward portion of the housing and a third position where both the knife and the writing utensil are retracted into the housing characterized in that the housing comprises a first opening in the forward portion of the housing having a circular cross section for fitting the writing utensil and a second opening in the forward portion of the housing having a rectangular cross section for fitting the knife, said rectangular cross section having a height which is at least twice its width, wherein the first opening and the second opening are arranged on top of each other so that a central portion of the first opening is shared by a central portion of the second opening, and wherein the height of the first opening is at least 1.25 times smaller than the height of the second opening.

2. A multi tool according to claim 1, characterized in that the first opening and the second opening are arranged beside each other as two separate openings in the forward portion of the housing.

3. A multi tool according to claim 1, characterized in that the width of the first opening is at least 1.25 times greater than the width of the second opening.

* * * * *